United States Patent [19]
Hanson

[11] Patent Number: 4,718,249
[45] Date of Patent: Jan. 12, 1988

[54] APPARATUS FOR HEATING AND COOLING

[76] Inventor: Wallace G. Hanson, Rte. 2, Box 103, Dodge Center, Minn. 55927

[21] Appl. No.: 789,703

[22] Filed: Oct. 21, 1985

Related U.S. Application Data

[63] Continuation of Ser. No. 600,481, Apr. 16, 1984, abandoned, which is a continuation-in-part of Ser. No. 371,116, Apr. 23, 1982, abandoned.

[51] Int. Cl.$^4$ ............................................. F25D 23/12
[52] U.S. Cl. ....................................... 62/263; 62/453; 165/48.1; 165/63; 237/2 B
[58] Field of Search ................ 62/DIG. 6, 119, 235.1, 62/259.1, 259.4, 262, 263, 324.1, 453; 98/31; 165/45 S, 53, 63, 48 R; 126/429; 237/2 B

[56] References Cited

U.S. PATENT DOCUMENTS

| | | | |
|---|---|---|---|
| 2,118,949 | 5/1938 | Scott | 62/259.4 X |
| 2,462,557 | 2/1949 | Santee | 62/259.1 X |
| 2,478,617 | 8/1949 | Anderegg | 62/263 X |
| 2,499,736 | 3/1950 | Kleen | 62/119 X |
| 2,847,834 | 8/1958 | Atchison | 62/DIG. 16 |
| 3,191,391 | 6/1965 | Muller | 62/3 |
| 3,308,633 | 3/1967 | Kribzer, Jr. | 62/324.1 |
| 3,552,133 | 1/1971 | Lukomsky | 62/3 |
| 4,187,688 | 2/1980 | Berg | 62/235.1 |
| 4,197,993 | 4/1980 | Trombe et al. | 126/429 |
| 4,199,952 | 4/1980 | Berg | 62/119 X |
| 4,267,825 | 5/1981 | Ward | 165/105 X |
| 4,280,333 | 7/1981 | Corliss et al. | 62/259.1 |
| 4,295,342 | 10/1981 | Parro | 62/119 |
| 4,309,980 | 1/1982 | McCormack et al. | 62/119 X |
| 4,316,363 | 2/1982 | McKirdy | 98/31 X |
| 4,333,517 | 6/1982 | Parro | 62/119 |
| 4,341,202 | 7/1982 | French | 62/235.1 |
| 4,505,328 | 3/1985 | Schmitt | 62/263 X |

Primary Examiner—Lloyd L. King
Attorney, Agent, or Firm—Paul L. Sjoquist

[57] ABSTRACT

Disclosed is a method of and apparatus for heating and cooling. The method and apparatus employ a thermodynamic moat across which heat energy conductance can be entirely prohibited. The moat comprises a heat source for a heat pump. The heat pump can be contained within the thermal protection of the moat. Thus its energy of operation may be added to, rather than lost from, the system. Structures for absorbing solar irradiation are disclosed, as are means to contain these structures within the protection of the moat, thereby to overcome grave deficiencies of solar collectors used in cold climates. A method of and apparatus for utilizing the solar absorber structures for summer cooling are also disclosed.

10 Claims, 10 Drawing Figures

APPARATUS FOR HEATING AND COOLING

This application is a continuation of application Ser. No. 600,481 filed Apr. 16, 1984, now abandoned, which is a continuation-in-part of application Ser. No. 371,116 filed Apr. 23, 1982, now abandoned.

BACKGROUND OF THE INVENTION

The present invention relates to a method of and apparatus for insulating enclosed structures such as houses, offices and factories against heat loss.

Material used for thermal insulation is a passive agent. Incorporated in the attic of a house or in the lining of a ski jacket, the action of insulation is strictly that of retarding the flow of heat. In the end, insulation material cannot prevent heat loss; it can only slow it down. Thus if a house has been heated to 70° F. and the out-of-doors is 0° F., then the temperature in the house will gradually fall to match the outside temperature unless additional energy is supplied to the house.

In the U.S. building trades the effectiveness of insulation is customarily designated by an R value. The R value is a function of the thickness of the insulation material and the inverse of its thermal conductivity. it is defined with the following equation:

$$R = \frac{\text{(hours of test)} \times \text{(square footage)} \times \text{(delta } T\text{)}}{\text{Btu's conducted}} \quad \text{(Eq. 1)}$$

where delta T is the difference in temperature in degrees Fahrenheit between the hot side of the insulation material and its cold side Mathematically, R cannot be defined unless there is some finite heat loss through the insulation material; otherwise a zero divisor appears in the right-hand term. The loss of heat through known insulation materials is thus implicit.

The present invention relates to a method for the efficacious application of a heat pump. Heat pumps are devices that use a low entropy energy advantageously to move high entropy heat, effecting a desired heating or cooling effect. A vast literature which includes refrigeration, heating and air conditioning exists on the subject. Heat pumps generally employ a reversible chemical or physical process which may take place isothermically. There are commercial units and theoretical devices that employ condensation and vaporization, adsorption and desorption, solution and dissolution, freezing and thawing, absorption, sublimation, hydride formation, phase change, thermoelectric transfer and other processes.

Heat pumps may be operated by electric motors, diesel engines, wind and water power, sunlight, solar-powered freon turbines, gas flames, discharged process heat, and other energy forms.

Heat pumps are attractive when fuel is expensive. Commercial vapor compression type heat pumps multiply their input energy by a factor called a coefficient of performance (COP).

$$COP = \frac{\text{heat energy moved}}{\text{energy supplied to operate device}} \quad \text{(Eq. 2)}$$

For the inorganic operating fluid ammonia the theoretical maximum COP is 5.55, for sulfer dioxide it is 5.67, for some of the synthetic halogenate hydrocarbons it is 6.6, in the cooling mode. For devices that operate on the water vapor/water cycle it is 3.73. The heat moved is equal to the Btu's to operate the heat pump times the COP. As a practical matter COP's of 1.8 to 4 are achievable under favorable conditions with synthetic working fluids and compression heat pumps. The most favorable condition has the source of heat at or above the temperature of the discharge. Some commercial heat pumps used for domestic hot water service use an automatic cutout when the heat source temperature falls below 45° F. because their efficiency tends to be quite impaired in such an environment.

It is disclosed in U.S. Pat. No. 4,267,825, issued May 14, 1981, that the effectiveness of heat pumps is limited by the fact that they will operate and provide a COP of 2 to 4 only when the outdoor air temperature is greater then between about 45° to 50° F. At lower temperatures, the COP is reduced until, at a temperature of about 10° to 20° F., the heat pump can no longer effectively draw any heat from the ambient outside air.

The present invention relates to means for absorbing and utilizing solar irradiation. Even in the coldest parts of the United States, substantial solar energy falls upon our structures. In a paper entitled "A Rational Procedure for Predicting the Long-Term Performance of Flat-Plate Solar-Energy Collectors", in Vol. 7, No. 2 edition of *Solar Energy* (1963), Liu and Jordan give values of monthly average daily total radiation received on a horizontal surface after penetrating average local atmospheric conditions. They offer data on average daily total Btu's per square foot. Some of their data for St. Cloud, Minn., are quoted below. Calculated from these data are the energy equivalent of this radiation in gallons of fuel oil for the month for a house assumed to be a 30-foot square lying on the ground, using the nominal 132,000 Btu's per gallon energy content for the fuel oil. A three-dimensional house of course presents greater collection surface than a full-scale floor plan, so there is some understatement of the calculated results.

|          | Avg. Btu/day/sq. ft | Gal./Mo. |
| --- | --- | --- |
| October  | 890.4  | 191 |
| November | 545.4  | 111 |
| December | 463.1  | 97  |
| January  | 632.8  | 133 |
| February | 976.7  | 186 |
| March    | 1383.0 | 292 |

For the typical house, most of this energy falls on the roof. Much of it is reflected, reradiated, blown away in the wind, or convected to the sky in a thermal. Some of the remainder is conducted to the attic, where standard practice has it dissipated by convection through vents to the outside. The purpose of the ventilation is to evacuate water vapor which might otherwise condense in the insulation and to cool the roof so that snow cannot melt, later to form ice dams that can be quite injurious to a house. Thus the example home in central Minnesota rejects by design the energy equivalent of a thousand gallons of fuel oil provided naturally each heating season. Investigation of means to capture and utilize some of this lost energy is intense.

Above the atmosphere of the earth solar energy density has been found to average 1353 watts per square meter. The Stefan-Boltzmann Law predicts the temperature to which a perfect absorber will be heated by radiation from the sun:

$$E = kT^4 \quad \text{(Eq. 3)}$$

E being watts per square meter, k being 5.603/100,000,000 and T being the temperature in degrees Kelvin. Substituting in Stefan-Boltzmann gives the temperature at 394° K., equal to 121° C. or 250° F. This is an equilibrium temperature. Cooled below this equilibrium, a perfectly black collector surface absorbs the mostly high-energy, short-wavelength radiation, much of it visible light, emanating from the sun. The collector heats up. Above this equilibrium temperature the collector radiates more energy than it takes in. It sends low-energy, long-wavelength, invisible radiation out into the 4° K. heat sink of the far reaches of the universe. It cools down to 250° F.

Down on earth the same process takes place, but the solar radiation is attenuated by the atmosphere. On earth, maximum energy density is about 1000 watts per square meter. Thus on a clear day a perfect absorber would equilibriate at a theoretical maximum of about 198.5° F. In practice the Stefan-Boltzmann equilibrium is hardly approached. Even under unobscured insolation, a black piece of tin could reach 25° to 50° F. above ambient at best, useless except perhaps to fry an egg on a hot day. Heat is lost to the atmosphere at a rate of 2 to 10 Btu's per square foot per degree of temperature F. that the collector attains above ambient.

Thus there are two problems. There is the problem of reradiative heat loss that exists even in outer space. There is the problem in the earthly environment of heat loss to the surroundings.

The most widely known approach to the problem of reradiation is to employ the "greenhouse effect." Many glasses and plastics have a transparency to the sun of 98% under laboratory conditions and up to 90% in field conditions in stationary solar collectors. They are however opaque of dark to the long wavelength infrared that is reradiated from the collector's absorber. By covering the collector with one or two transparent sheets, the maker of the solar collector lets the sunlight go in but hinders the absorbed energy from leaving.

An additional or alternative measure is to fabricate the collector with a selective surface: an ultra-thin layer of a material which is good at absorbing sunlight is coated on a substrate such as shiny metal which is known to be poor at radiating long-wave energy. One successful approach involves nickel plating the absorber and then overcoating the nickel with an electrodeposition of chromium oxide. Selective surfaces that absorb 95% of the solar energy but emit only 10% of long wave energy are known in commerce.

The greenhouse has the beneficial side effect of blanketing the collector in a layer of still air, thus reducing the conductance of its heat to the surroundings. It ameliorates both problems with a single mechanism.

One commercial device uses a selective absorber surface encased within a partial vacuum held by a glass tube. Its heat loss may be as small as 0.2 Btu per square foot per degree F temperature difference, almost an order of magnitude less than a collector incorporating a single glass cover—and 50 times less heat loss than an unadorned flat black plate under average conditions on earth.

The technology has proven fruitful, especially under optimum conditions. Positioned, say, in a desert with dry clear air and a temperature in the sun of 130° F., commercially available flat solar collectors are capable of delivering upwards of 70% of the 300 Btu's per square foot per hour provided by sunlight. Output temperatures may suffice to char wood.

Efficiency drops, however, when the sunlight is less intense and the ambient temperature lowers. Even on the desert the collector that does so well in the heat may drop to 27% efficiency if the temperature lessens to 30° F. and a haze attenuates the sunlight by half. Then instead of delivering 210 Btu's per hour, it offers 40.

In the current state of the art, solar collectors fall to zero efficiency when it is quite cold and the sun is obscured or reaches the collector surface at a small angle of incidence. At sub-zero F temperatures commercial units may actually be counterproductive, consuming more operating energy than they wrest from the sunlight. When produced by a reliable manufacturer using sound technology, competently applied and installed, solar collectors of the flat-plate type are, despite the foregoing limitations, operable and useful. They are not, however, economical for Americans in general. At this writing, the bottom line comes out in favor of fossil fuel for space and water heating because of high capital and interest costs. The most promising application in the northern part of the United States is partial load hot water heating (a modest-size unit's assuming a less than total responsibility for all a family's hot water, i.e. with a backup). The equipment may be productive almost year 'round and is of use when operating conditions are most ripe—during hot, sunny days. Recent local analysis, however, revealed this application to suffer in comparison with the most expensive alternative, namely electrical resistance water heating. For consumers of high-rate REA-supplied resistance hot water heat, a 40%+Federal and state tax credit on the full capital cost makes partial load hot water heating economically efficient if the consumer has sufficient tax liability to absorb the tax credit.

Passive solar energy utilization is more economically attractive in general. Passive systems can be simple, indeed. Where there exists a heavy heating load and sunny winter days, planning fenestration for sunny exposures gains considerable advantage with little or no attached marginal cost. There are drawbacks and objections to even such simple and sensible measures. They may result in quite unconventional looking structures, which some find distasteful. Others may fear this appearance places their housing investment at added market risk. While many passive solar energy techniques can be employed virtually without cost when incorporated during the planning stage, they may be unfeasible in retrofit. The replacement rate of buildings is so low that if all new construction were to exploit fully passive solar energy technology, a pronounced net effect would be slow to appear.

It is an object of the present invention to provide an apparatus and method to prevent the conduction of heat from the interior of an enclosed structure to its exterior.

It is a further object of the invention to provide a method of installing a heat pump so that its coefficient of operation is independent of temperature in the winter and so that it is operative and efficient at temperatures below the melting temperature of ice.

It is a further object of the invention to provide an apparatus to capture and utilize energy contained in the sunlight falling upon an enclosed structure even at sub-zero temperatures.

It is a further object of the invention to provide an apparatus and method to retrofit existing enclosed structures for hyperinsulation and solar heating.

It is a further object of the invention to provide a method and apparatus to prevent the conduction of heat from the interior of a structure to its exterior through ordinarily difficult places to insulate, including fenestration.

SUMMARY OF THE INVENTION

The invention is embodied in a method and apparatus for encasing a structure within a figurative thermodynamic moat. Rather than its being a water-filled ditch, this thermodynamic moat comprises a heat source for a heat pump. This figurative moat is situated within the barrier volume that is intermediate between an interior volume of the structure and the exterior. This moat may be maintained at a temperature very slightly less than the lesser of the interior or the exterior temperature. When this condition obtains, no heat whatsoever can be conducted across the moat, according to the second law of thermodynamics. Heat can then only flow into the moat.

In one embodiment the heat can flow into the heat sink isothermically, such as is possible when it is absorbed in the latent heat of evaporation.

With a thermodynamic moat so described positioned in all the enclosing means of an enclosed volume, in all the walls, windows, entryways, discharge apertures, intake apertures, attic and basement of a structure an unusual thermodynamic condition obtains. If the windows and doors are shut, the heat conductance to the exterior falls to zero. R value is the reciprocal of heat conductance. But the reciprocal of zero is undefined; thus no value of R can be sufficiently large to express the insulation effectiveness provided by the present invention. Installed as described herein, the moat surpasses the efficiency of known insulation materials. It surpasses the efficiency of the "Thermos" vacuum bottle, which is limited because it is not possible to obtain a perfect vacuum on earth.

Heat from said heat source is returned to the heat pump. In one embodiment of the invention, the heat pump is contained within the protection of the moat. Thus the heat that it removes from the thermodynamic moat, plus its energy of operation (which must according to thermodynamic laws be supplied from outside the system) may be retained within the interior of the structure. Ordinarily, with a heat source operated at a very slight temperature decrement, the amount of heat supplied to the heat pump from this source is slight.

Anticipating a harsh winter climate, the method and apparatus employs a secondary stage before the heat from the sink reaches the pump. In one embodiment a refrigerant medium is heated in this secondary stage to a point equal to or higher than the desired interior temperature. This may be accomplished by routing a return line to heat transfer means located in positions where interior convection causes heat to collect, in ceilings for example.

A secondary stage serves two beneficial purposes. It reduces the thermal gradient between the interior and the exterior, lessening the load of the system. Secondly, it may alter greatly the operating condition at the heat pump. If the incoming operating fluid has been heated to the temperature desired for heat output, then the COP of the heat pump is elevated, nearly to its theoretical maximum, given an efficient motive device and a well-engineered pump.

In one embodiment of the invention, solar energy is incorporated into the process. By placing the heat source in conductance with an exterior covering of the structure such as blackened aluminum roofing or earth-toned aluminum siding, virtually an entire structure can be converted to a solar collector. Under present economic conditions active solar collectors have, in many cases, been priced out of the market because truly effective ones must be elegantly designed and meticulously manufactured to overcome reradiative loss and heat transfer to the surround. The present invention circumvents these problems. With the heat source maintained at just below exterior ambient, there can be no losses to the surround. Further, so long as the sun is bright and the incident energy density provides under Stefan-Boltzmann an equilibrium temperature above exterior ambient, all the absorbed energy can be transferred adiathermically to the heat pump. The collector operates at its maximum efficiency independent of the environmental temperature. The invention thus eliminates the requirement for a "greenhouse" of glazing or double glazing, its attendant expense and maintenance burden and its inefficiency due to reflection, light absorption and heat conductance.

PREFERRED EMBODIMENT

The discussion that follows is in the main related to a process and apparatus for advantageously controlling the heat flows in enclosed structures, including the utilization of solar energy falling upon such structures. The use of the process and the apparatus of the invention has economic advantage and is a preferred application of the invention. It will be obvious to those skilled in the art that the system may be adapted to other applications including, but not limited to, process heat, distillation and crop drying. The following is intended to be descriptive and not limiting with respect to application.

Figure 1A:
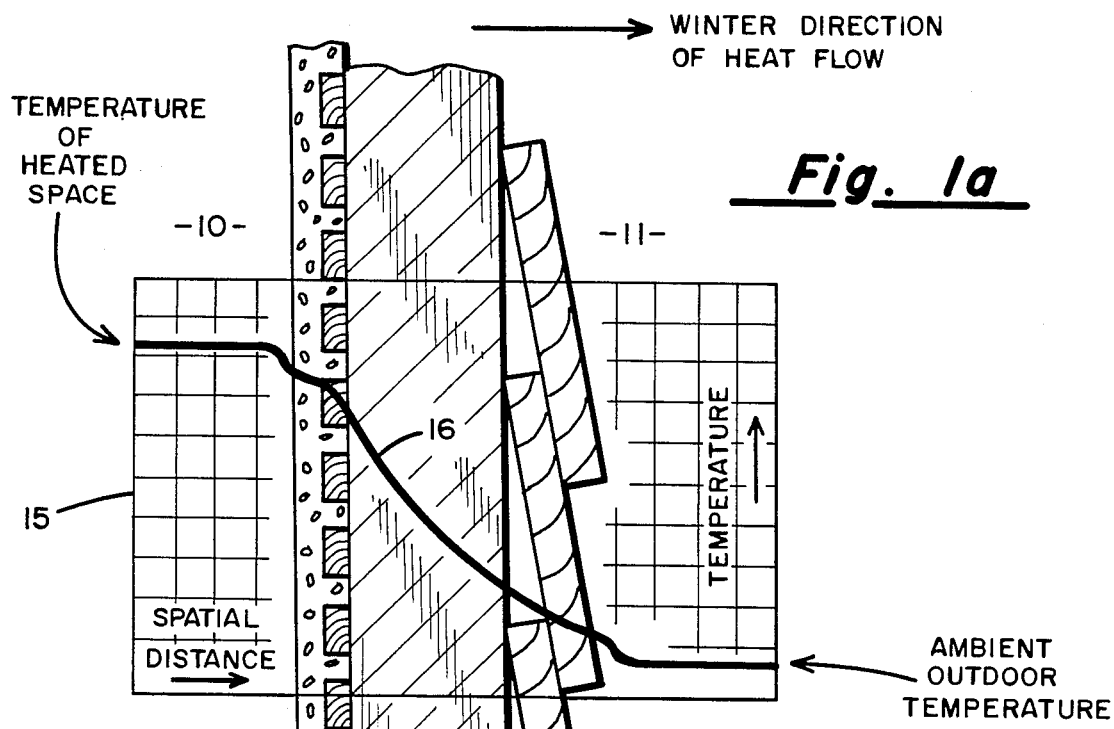
FIG. 1a is a section through the exterior wall of a frame house overlain with a symbolic temperature graph.

Prior to description of the preferred embodiment, attention is drawn to FIG. 1 which is, in effect, a statement of the problem. It is a section through a vertical volume intermediate between an enclosed volume and the exterior, namely a vertical cross section of the exterior wall 12 of a frame house of conventional American construction. Overlain on this section is a symbolic graph 15 of the temperature versus the spatial distance through the section from a warm interior 10 to a cool exterior 11. The temperature, as shown by line 16 through the section, drops as a function of heat conductivity of the material encountered and the delta decrement in temperature. A steeply falling gradient indicates a slow transfer of heat energy. Insulation applied anywhere in the system will affect the gradient, and the amount of heat transferred per unit time. But the most advantageous placement for good insulation is at the position where it can heat dam the greatest delta decrement in temperature, usually a position furthest from the interior. That strategy leaves the less effective insulation materials to deal with a lesser insulation challenge, a lower delta difference in temperature. Regardless of insulation, in a thermostatically controlled house the total drop in temperature will remain unaltered as will the direction of heat flow. The variable affected by insulation is the rate of heat flow.

The invention was developed in response to the realization that a substantial portion of humankind's use of very high quality (low entropy) fuel is employed to effect a relatively small adjustment in the air and washwater temperature for domestic and work environments. Given laboratory control, it would be possible to insulate our environments so that our cooking, our heating of scalding water for the dishwasher, appliance heat, lighting fixture heat, the motors in machine tools and human, pet and houseplant metabolism would amply shoulder our entire energy requirement for space heating and tempered water use. The laboratory model has been reduced to practice in the "Thermos" bottle. It operates without work. It requires no energy to function. It uses no fuel.

It was realized that if we were to budget a small quantity of high-quality fuel to do some work in managing heat flow in a structure, we might apply to a whole human habitation the laboratory principles illustrated in the convenient "Thermos" bottle. We might do so while maintaining comfort, ample ventilation, the convenience of plenty of hot water, the pleasure of a view through a broad window expanse and the aesthetic of housing styles that were conceived to please the eye before the mind comprehended the economics of international cartel formation or the physics of thermodynamics.

The small amount of thermodynamic work required in the embodiment of the present invention may be supplied by a heat pump. A heat pump is a device that advantageously moves heat, in the main, from a cooler place to a warmer place. It expends energy in doing so. According to the laws of physics, the energy so expended must come from a source other than the cool place or the warm place. Most any type of heat pump is applicable to the invention, provided only that it and its fuel supply are reliable. The heat pump is not only the master control of heat transfer, it is also a backup heating and cooling system in itself. Should a lightning bolt demolish the entire remainder of a domestic system embodying the invention, the occupants can still gain relief from hot or cold by huddling about the appropriate side of the heat pump.

Figure 1B:
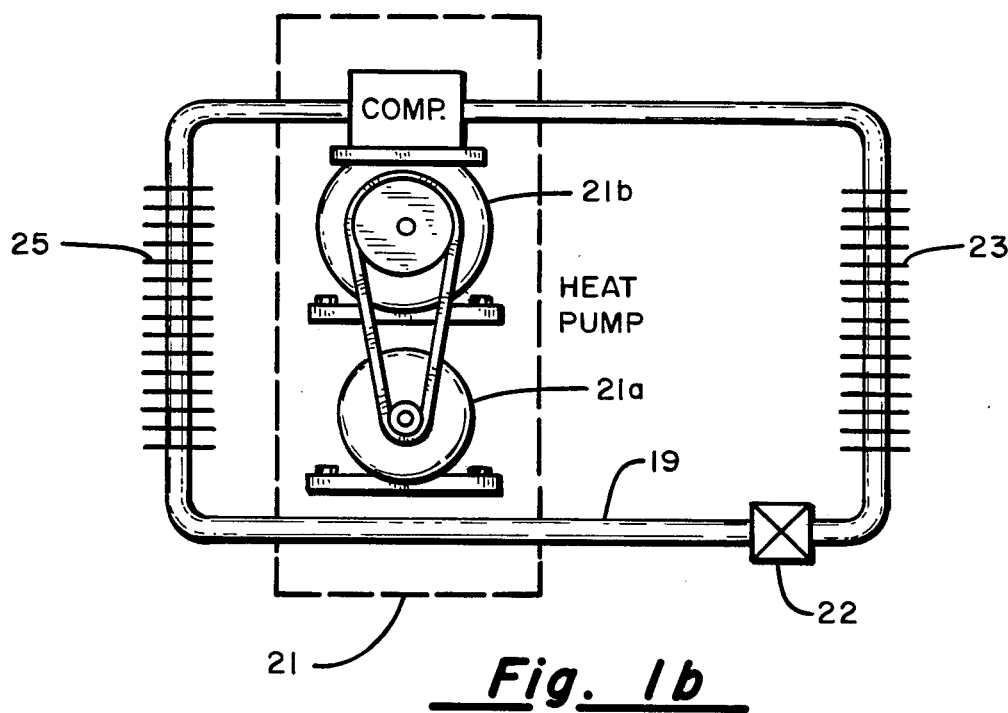
FIG. 1b shows a symbolic diagram of a conventional heat pump apparatus.

FIG. 1b shows a symbolic diagram of a conventional "heat pump" system, of the type generally referred to herein. A heat pump system comprises a heat pump mechanism interconnected with and acting upon means to take heat up from one part of the environment and means to discharge heat to another part of the environment.

FIG. 1b diagrams a well-known heat pump system, a practical application of the principles noted by Lord Kelvin in 1851.

FIG. 1b is a compression cycle refrigeration heat pump system stripped to its essentials. At least one example of apparatus of this type is possessed by the average American household. Some families deploy a half-dozen—one pumping heat out of the refrigerator and into the kitchen, another removing heat from the basement and delivering it to the hot water storage, another operating the freezer, another pumping heat out of the vent system for central air conditioning, and two more (using a gasoline or Diesel engine for power) to cool the passenger compartments of the family automobiles. The benefits of the heat pump are regarded by many as a necessity rather than a luxury. Its technicalities are well-known in the art, but we shall review the basics at this point.

Though not nearly so elegant and sophisticated as commercial devices, the drawing FIG. 1b depicts sufficient elements for operability. The mechanical essentials of the heat pump 21 include a compressor, here shown as a reciprocating piston compressor 21b, which is mechanically driven by drive motor 21a, here an electric motor of the most ordinary sort.

These moving mechanical parts of FIG. 1b operate a thermodynamic cycle. A working fluid, typically a synthetic halogenated hydrocarbon or fluorocarbon (e.g. the Freons and Genetrons), is contained within a closed circuit conduit 19. This working fluid is pressurized by the compressor 21b until it liquifies, and thus releases heat of condensation. The heat of condensation is given off by a heat discharge means 25 to the surroundings, said surroundings often being referred to as a "heat sink." The pressurized liquid then feeds through conduit 19 to a pressure reduction means 22, which is typically an expansion valve. The reduction in pressure across pressure reduction means 22 causes a change of state in the working fluid: it evaporates, causing the fluid to take up heat of evaporation equivalent to the heat previously lost, thus tending to depress the temperature in the vicinity. This heat transfer is facilitated by heat uptake means 23. The region around heat uptake means 23 may be thought of as the "heat source" for the system. The working fluid is next passed through conduit 19 back to compressor 21b, where the cycle is repeated. In some of the literature that side of the system wherein lies the heat sink is called the "condenser side" and that side of the system wherein lies the source is called the "evaporator side."

Typically heat discharge means 25 and heat uptake means 23 are constructed of metallic fins or other similar elements which facilitate the transfer of heat between the working fluid and its surroundings.

It will be obvious to any person learned in the art that the cycle of FIG. 1b can be reversed. In the particular device of FIG. 1b, one way to effect reversal is with the following two steps. Step 1, exchange the intake and outlet valves of the compressor 21b. Step 2, remove, reverse and reinstall the pressure reduction means 22. These steps done, the direction of flow of fluid changes from counterclockwise to clockwise. Consequently the heat source changes from the right side of FIG. 1b to its left side. As a further consequence the heat sink changes from the left side of FIG. 1b to its right side. Although a real device constructed according to FIG. 1b would continue to be operable thus reversed, being physically asymetrical its efficiency would suffer. Though similar in principle, systems intended for reversible operation may contain sophisticated, efficient engineering solutions, now well-known to those learned in the art.

Naturally, FIG. 1b illustrates the theoretical essentials of a heat pump: It uses energy from an external supply to operate. It takes heat from one place which may be cool already. It moves this heat to another place which may be warm already. If thus called upon to pump heat up a thermal gradient it performs work, according to the physicist's definition of work.

Though the compression cycle heat pumping system depicted in FIG. 1b dominates the marketplace, it is by no means the only kind of heat pump. One system long well-known is embodied in the absorption refrigerator. A commercially successful example of the absorption refrigerator is the Electrolux-Servel Absorption Process. With some imaginatively complex plumbing attributed to Platen and Munters, it employs a chemical means, namely the absorption and desorption of ammonia in cooled and then heated water, in place of a motor and mechanical compressor. Rather then being driven by an electro-mechanical device, its motivation is likewise chemical—the combustion of methane in a gas flame. It even overcomes the need for a mechanical pump by compensating differences in partial pressures in its internal fluid circuitry with the partial pressure of hydrogen gas. As a system, however, it is not entirely dissimilar from the electrical-mechanical device drawn in FIG. 1b. The Electrolux-Servel, or any absorption process system for that matter, bears four resemblances to the device of FIG. 1b: 1. It delivers warm, compressed, liquid refrigerant fluid to a heat discharge means. 2. It conducts cooled liquid refrigerant fluid thence to a pressure reduction means, so that the liquid refrigerant fluid evaporates. 3. In evaporating, the refrigerant fluid takes up heat. 4. The system finally returns the gassified, warmed refrigerant fluid to its mechanism for recycling. In concept the internal mechanism of any absorption unit, including the Electrolux-Servel, is substitutive for the motor and compressor of FIG. 1b.

Figure 1C:
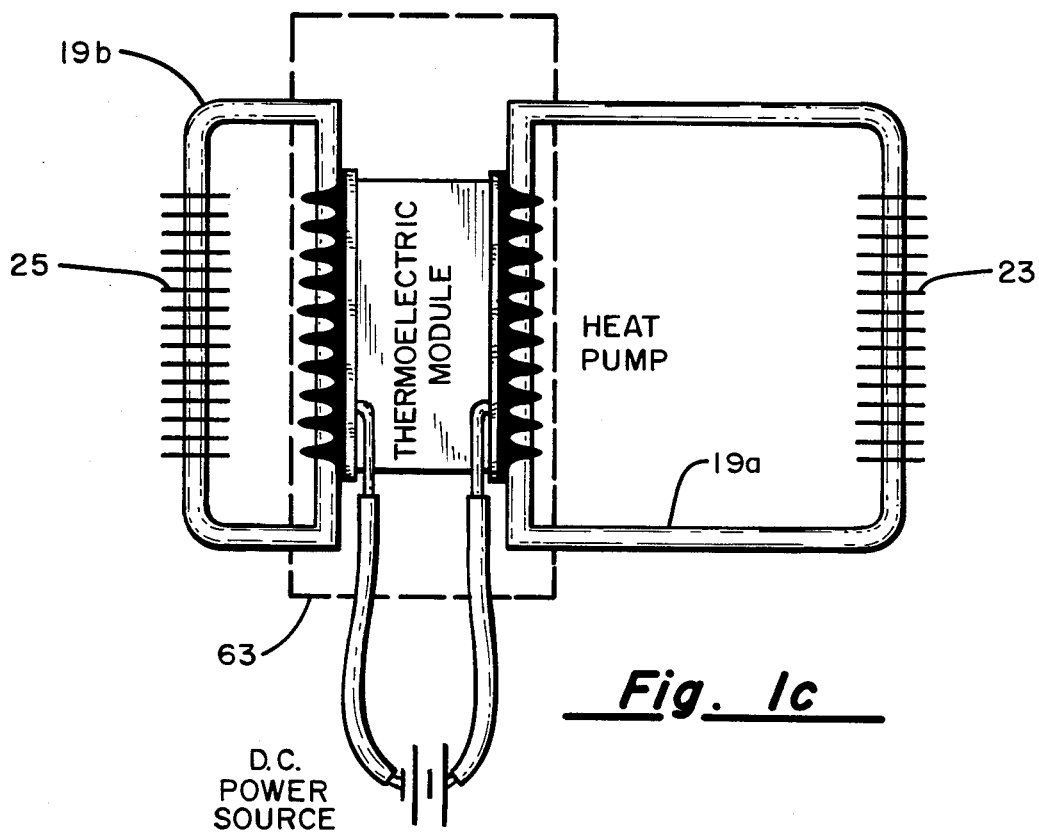
FIG. 1c shows a symbolic diagram of a different form of heat pump apparatus.

There are also solid-state heat pumps. They employ no fluids or moving parts aside from electrons and "holes". An example of a commercial device of this type applied in a system that might serve the same function as the heat pump system of FIG. 1b is depicted in FIG. 1c. In this example, heat pump 63 is formed of a thermoelectric module such as a Borg-Warner standard thermoelectric module sold under model Designation 950–71, a semiconductor-based electronic heat pump. It pumps heat from a cold circuit on the right of FIG. 1c to a warm circuit on the left of FIG. 1c.

Heat collected by heat uptake means 23, which may be at a low temperature, circulates by convection in a closed circuit conduit 19a to heat pump 63. Within said module, couples comprising semiconductor materials operating with the Seebeck effect generate a current at the cool side of a heat pump 63, taking up heat in the process. (Seebeck noted in 1821 that a circuit of two dissimilar metal conductors generates a current when one of the two junctions is heated.) At the warm side, current thus produced generates heat by an opposite process, the Pelìter effect, discovered in 1834. As shown in this particular application, heat so generated is dissipated by the natural convection of fluid in a conduit 19b to heat discharge means 25. Operation required the addition of direct current from an outside source. Internal losses include electrical resistance and thermal conductivity.

Multiple circuit systems such as the two closed loops 19a and 19b concatenated with the thermoelectric heat pump 63 of FIG. 1b are common in refrigeration technology. Brine lines for example are used to remove heat by forced convection from ice skating rinks to the evaporator side of high-capacity compression systems.

Though it would need no pressure reduction means to do so, the system of FIG. 1c could perform the function of the system of FIG. 1b.

Laboratory devices operating in the cryogenic regime have achieved the lowest known temperatures by the stepwise application and relaxation of magnetic fields on paramagnetic salts. Other devices used in cryogenic heat pumping are reciprocating and turbine expanders using insenthalpic expansion, the Stirling, Vuilleumier and Gifford-McMahon refrigerating engines, the Pomaranchuk refrigerator and many other elaborations of the theme struck by Kelvin more than a century ago.

The present invention does not add a new heat pump to this technology. Rather, it comprises a process, articles of manufacture and structures employing a heat pump—in principle, any known heat pump—in a new way to achieve unexpected, beneficial, new results.

Any type of, or mixture of types of, monostage or multiple stage heat pump may be operable in the preferred embodiment, the description of which follows. For the sake of clarity, however, the inventor confines the discussion to the type of heat pump that capitalizes on the release and uptake of heat during the change between the liquid and the gas state of a single volatile fluid operating under two different pressures as it is forced through a continuous cycle. In other words, the heat pump mechanism labelled 21 in the drawing figures may be, but is not limited to, either the type described above as a compression cycle heat pump or an absorption heat pump.

The preferred embodiment will now be described with reference to FIGS. 2-8, which broadly illustrate its basic nature and function.

For the sake of example it will be assumed in the following description that the heat pump mechanism 21 emanates to a pressure reduction means 22 a volatile liquid via a sealed tube or plenum 19, the volative liquid being maintained under sufficient compression that it does not boil. This assumption is illustrative and not limiting. Some operable mechanisms, for example, may require no liquid at all: alternative heat pumps may operate with crystals or "flowers" that sublime directly from the gas state, or employ the principles of thermoelectric transfer.

The pressure on the volatile liquid is reduced at pressure reduction means 22. Pressure reduction may be effected by, but not limited to, such means as a remote control expansion valve. Remote control is exemplified by, but not limited to, a solenoid valve driven through a wheatstone bridge, resistances in which are a function of the output of appropriately placed thermocouples.

The liquid passing through pressure reduction means 22 responds to the pressure gradient by gasifying, taking up its characteristic heat of evaporation in the process.

As it does so it draws heat from the heat uptake means 23, continuing to do so until attenuated or halted by a control means or system failure. It is preferred, but unnecessary for operability, that energy absorption through heat uptake means 23 continue until the process depresses the temperature at the locus of heat uptake means slightly below the lower of the indoor or the outdoor temperature. This is like running a refrigerator at room temperature, and very little work is actually being done. The aim of the exercise is not work, however, it is control. A relatively small amount of energy has created an adiathermanous moat. Heat cannot be conducted from the inside wall 26 to the outside wall 27 of the upright enclosing part of the example structure. It is prevented from doing so by the probabilities of the second law of thermodynamics. Thermal energy that moves must enter the heat uptake means 23.

Heat radiation is also to be considered. Unless wall 26 and wall 27 are the same temperature and reflectivity, low-energy long-wavelength electromagnetic radiation will in net reflect from one side to the other, where some of it will be converted by absorption to sensible heat, with the rest reflected back for another cycle. This energy transfer cannot escape the thermodynamic moat, however. Unless wall 26 or wall 27 are transparent, the energy that is not taken up directly as radiation to heat uptake means 23 will be taken up indirectly because of its being in thermal conductivity with both walls 26 and 27 and in the convective path of the air between them. As will be obvious to anyone learned in the art, heat uptake means 23 may advantageously be made highly infrared absorbent and shaped and positioned for absorption of reflected, irradiated and convected energy in the space formed by walls 26 and 27 and other strategic locations.

Upon leaving the heat uptake means 23 the working fluid is now partially or entirely gasified and cooled. Though not essential to the operativeness of the process, the working fluid may now enter a secondary heat uptake means 24. Said means may advantageously be placed at some position within the structure where warm air tends to rise and stagnate. It will assist the efficiency of the process if the secondary heat uptake means 24 is placed and designed, and the flow and volume of working fluid within controlled, so that the flow and fluid attains thermal equilibrium with the surrounding air before its return to the heat pump mechanism 21.

There is a further beneficial effect if secondary heat uptake means 24 is located in the path of heat transfer from the warm interior to an interface with the environment. By its cooling action it reduces the delta difference of temperature of all the materials in the thermal flow between heat uptake means 24 and the heat sink containing heat uptake means 23. This reduces the Btu's that each of these materials can pass in unit time, as defined by Equation 1. The load of the whole system is lowered thereby.

Figure 2:
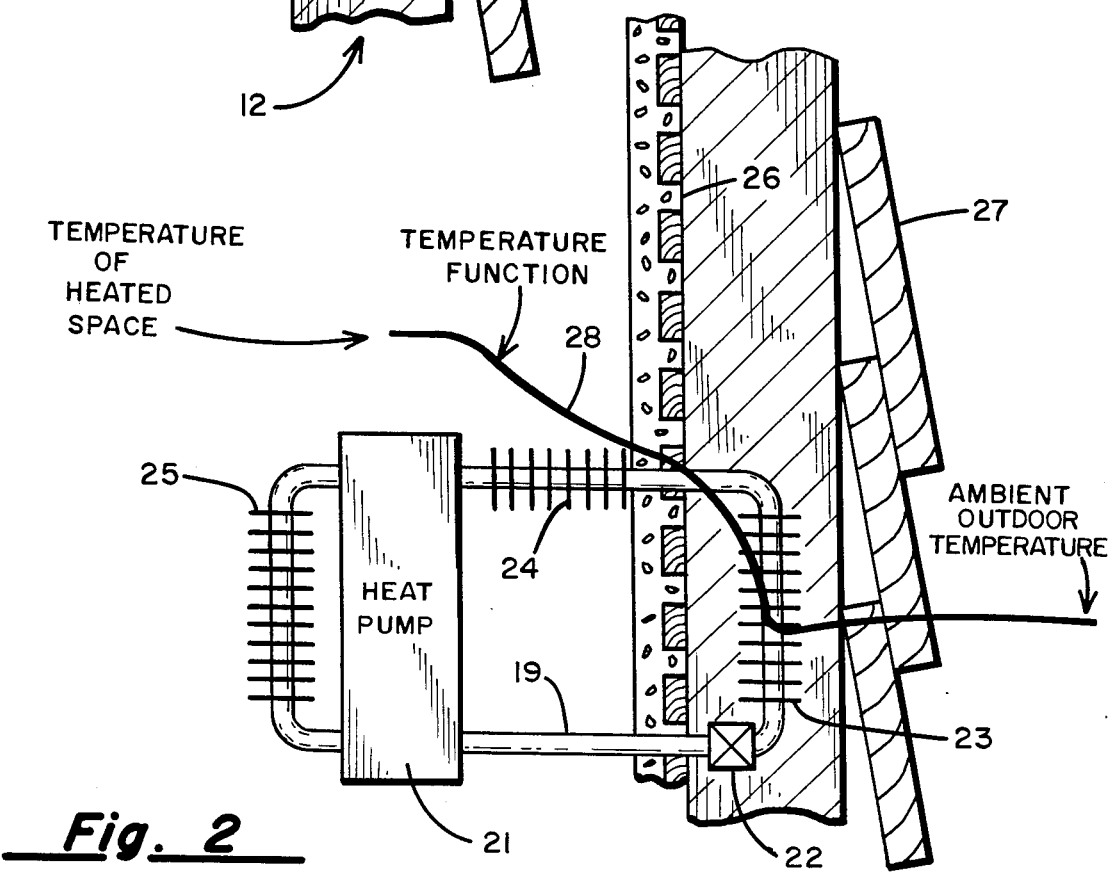
FIG. 2 is a cross section through a frame house retrofitted with a heat pump having its heat source in an exterior wall, with a symbolic depiction of temperatures across the section.

Now warmed and gasified, the working fluid may be compressed to its liquid state by the heat pump mechanism 21. The pump moves it to heat discharge means 25. The heat of vaporization of the assumed fluid is given off. It may be employed for domestic heat and hot water by well-known means. As shown in FIG. 2, the process has been described for the heating mode of the preferred embodiment, and line 28 represents the spatial temperature gradient through the structure.

There are several important aspects of the invention which are symbolized by FIG. 2, which significantly contribute to the efficiency and utilization of all of the components of the invention. First, friction generating components of the heat pump mechanism are placed inside the structure being heated, so as to take advantage of the heat generating losses caused by the mechanism itself. In FIG. 2, it should be noted that heat pump mechanism 21 is physically located within the confines of the structure represented by interior wall 26. Second, at least a portion of the heat collection mechanism is placed directly in the path of normal heat losses. In the example of FIG. 2, this is shown symbolically by the placement of heat uptake means 23 between the interior wall 26 and the exterior wall 27 of the structure. Third, the utility of the invention will be enhanced if at least a portion of the heat collection apparatus is placed inside the structure in a region wherein heat is known to exist but is in a pratically unusable form. For example, in the illustration of FIG. 2, if heat uptake means 24 is located near the interior ceiling of the structure it will collect existing heat but heat which is practically unusable by the occupants within the structure.

The process may be maintained by thermostatic control to a comfortable temperature and may be operated continuously or by surge. In the heating mode, however, it is not limited to room temperature operation. It will maintain any elevated temperature above the surroundings, being limited by the heat tolerance of the electric motors, etc., of the apparatus used and the lowest melting point of any material in the system. There are many potential applications of economic significance, including heat storage and pipeline transport of materials that are solid or viscous at ambient temperatures.

If the heat intake is at or above room temperature and heat discharge is at room temperature, the entire system does no theoretical work. There are friction losses in the heat pump, but they are recouped by the system. If heat discharge is used for domestic hot water, as an example of discharge to a higher temperature, the heat pump must do theoretical work but it may do so at a very high coefficient of performance.

Given a well-engineered and skillfully applied system, it is possible, and in fact advantageous, for the heat pump to be quite small in capacity. This produces good economy. Low capacity will however slow the process' return to equilibrium following an extrinsic event such as a door blowing open in the wind.

Figure 3:
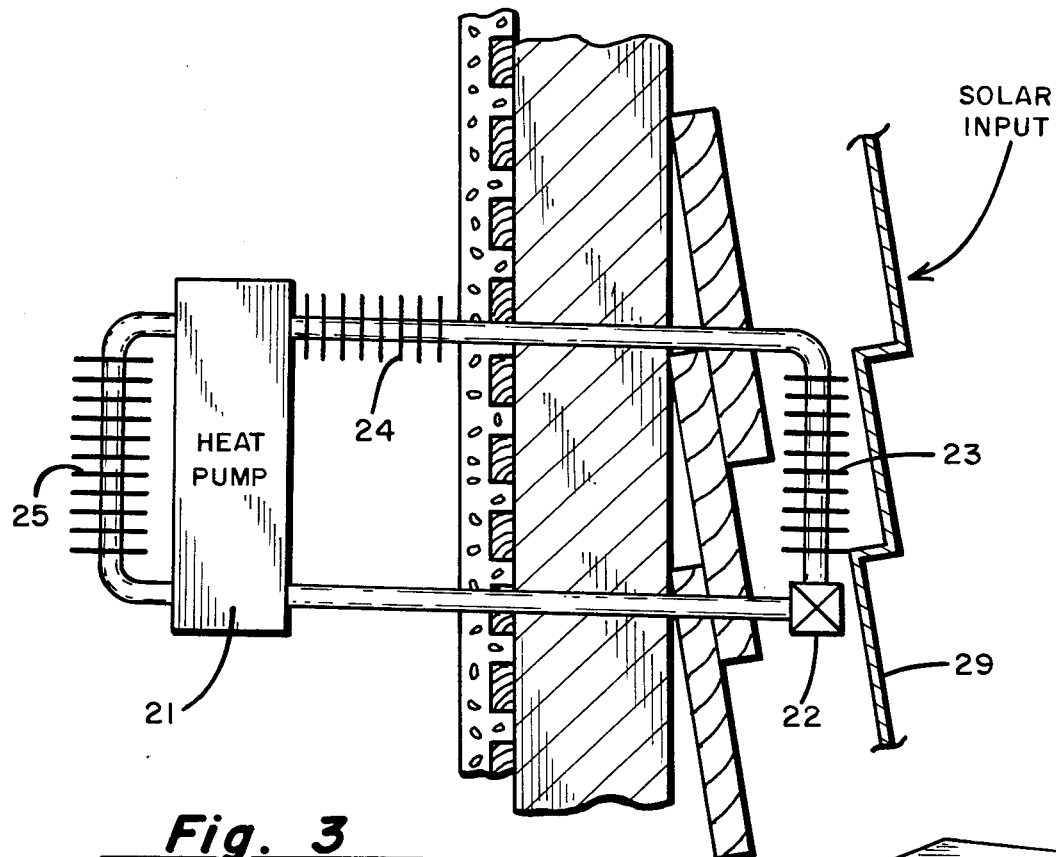
FIG. 3 is a cross section through a frame house retrofitted with a heat pump and a solar collection means.

In FIG. 3 the system is extended to include the input of solar energy. To effect this extension in an existing structure it may be necessary to add solar collector 29 to the exterior of the structure. Examplary, but not limiting, means are aluminum roofing coated dull black and aluminum siding with a dark-colored exterior. Primary heat uptake means 23 is moved to the space between the original structure and solar collector 29. There it operates as in FIG. 2 between periods of insolation.

It will assist the thermodynamic efficiency of the solar collection means if the temperature of heat uptake means 23 is maintained as low as possible, and preferably no higher than exterior ambient. Operated with heat uptake means 23 maintained barely less than the exterior ambient temperature and in thermal conductance with the solar input means 29, an unusual condition obtains. The solar collector 29 cannot, according to the second law of thermodynamics, conduct any heat to the surround. It conducts essentially all the absorbed solar energy through the heat uptake means 23 thence through the system of the invention and ultimately out the heat discharge means 25. Thus the collector 29 is operable at very high rates of efficiency even without glass covers or selective absorber means. Furthermore, unlike heretofore known solar collector means, its efficiency is independent of the temperature where it is operated. If secondary heat absorbers 24 are in place and if heat discharge at heat discharge means 25 is at interior ambient, very little thermodynamic work is done, and the COP of the heat pump mechanism 21 may approach its theoretical limit.

There are two identified sources of loss or inefficiency. Solar collection means 29 will reflect rather than absorb some of the incident radiation. For a simple surface coated with black paint 10% loss may be a reasonable figure. There will also be a reradiative longwave loss. It is reduced according to the fourth power of its reduced temperature, according to Stefan-Boltzmann. But there is also a trade-off with the surround. Everything in the surround of a lighter color or higher temperature will be making a net electromagnetic radiative contribution to solar collector means 29. The equation is site dependent. Worst case is the Stefan-Boltzmann analysis for a collector in outer space. All in all solar collector means 29 applied in any reasonable sunny place is likely to be a very cheap but a very fine flat-plate solar collector, equalling or exceeding in adverse temperature conditions the operation of state-of-the-art collectors operated in optimum conditions.

For summer cooling it is possible simply to run the system backwards. Most of the efficient merchantable solar energy collectors make quite bad thermal discharge units for air-conditioning, for the very reasons that make them good collectors. This is far less true of the present invention as described to this point because it avoids radiative and convective losses by a dynamic rather that a static system, and thus may be reversed dynamically. Nonetheless, the system so far described is probably best applied to climates with a heavy winter heating requirement and a moderate air conditioning requirement. In such a climate the following summer strategy may prove most effective, comfortable and efficient.

During the period of most intense insolation, the system is operated as a heating system. During the few hours before and after noon, sunlight impingent upon the structure is utilized to heat domestic hot water, dry clothing and perhaps to warm a swimming pool. The effect is to cool the exterior of the structure, reducing from the air conditioning load the greater portion of the heat due to direct insolation (and prolonging the life of surface coatings of the structure, incidentally). Then when the exterior surfaces are in deep shade or at night, the system is reversed and run long and often enough to achieve cool comfort.

In climates requiring little winter heating but substantial and persistent cooling, an elaborated system infra is preferred.

Figure 4:
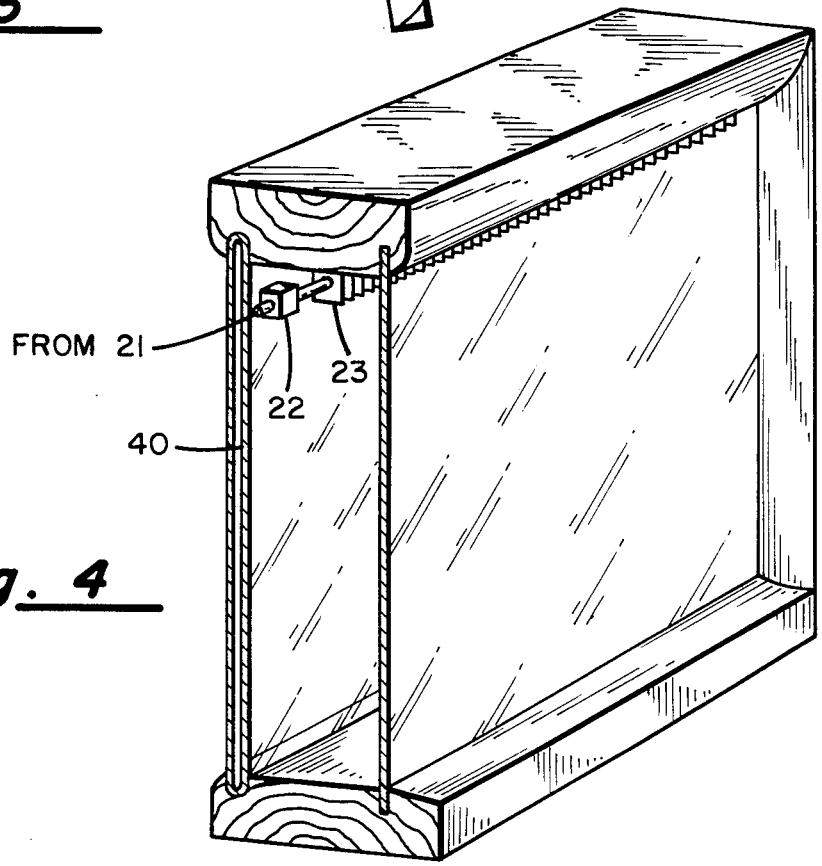
FIG. 4 is a partial section showing the installation of a heat source for a heat pump in fenestration.

FIG. 4 reveals a suitable method of incorporating a primary heat uptake means 23 in fenestration. So applied, windows 40 cannot conduct heat if uptake means 23 is at the lowest temperature in the system. If provided with a suitable exposure and means for reflecting radiant energy during periods between insolation, such fenestration become a hyperefficient solar collector by day and a perfect insulator by night. A pressure reduction means 22, of the type described hereinbefore, is also shown in FIG. 4.

Figure 5:
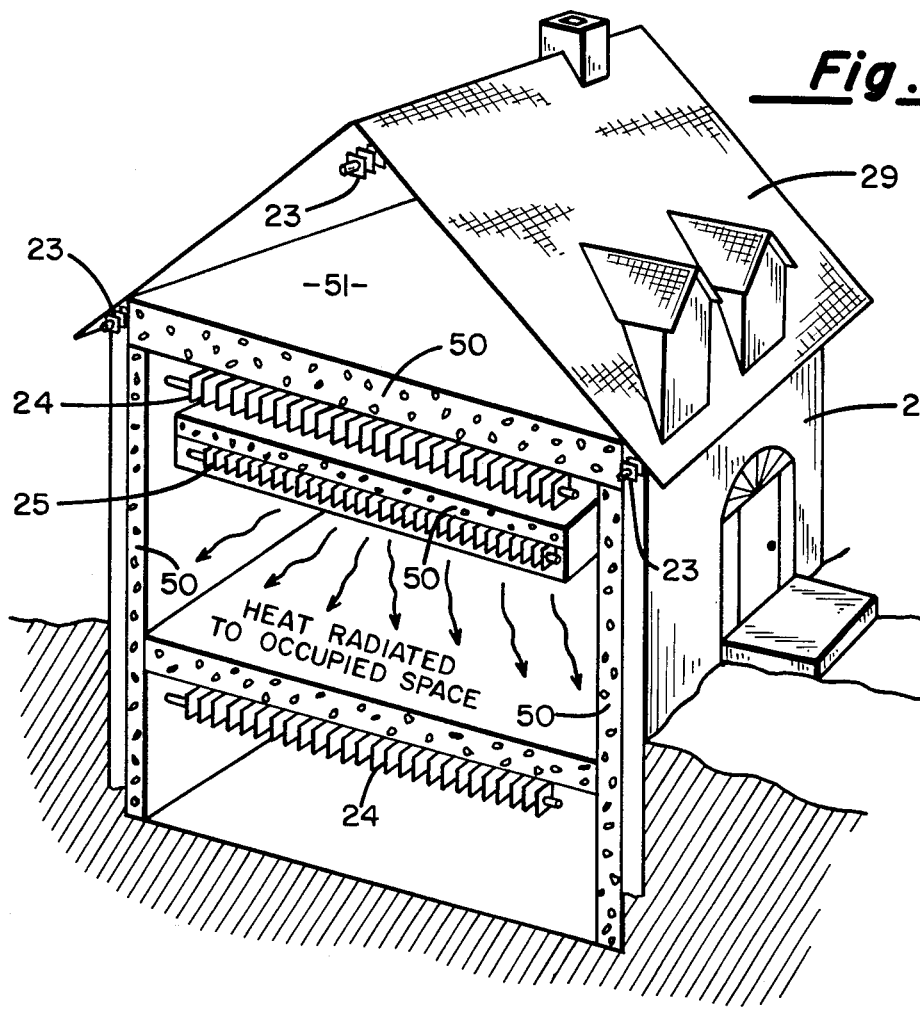
FIG. 5 shows a structure incorporating a heat pump, a heat source, solar collection means, buffer walls and ceilings.

FIG. 5 illustrates an embodiment of the invention in a structure designed to exploit some of its advantages, with secondary heat uptake means 24 in ceilings, strategic placement of passive insulation materials 50 and an attic 51 comprising a sealed plenum. Primary heat uptake means 23 may be placed between the interior and exterior walls, as well as in attic 51; alternatively an outer wall surface 29 may be constructed as a solar collector, as has hereinbefore been described, and primary heat uptake means may be placed between the exterior wall and solar collector surfaces 29.

Figure 6:
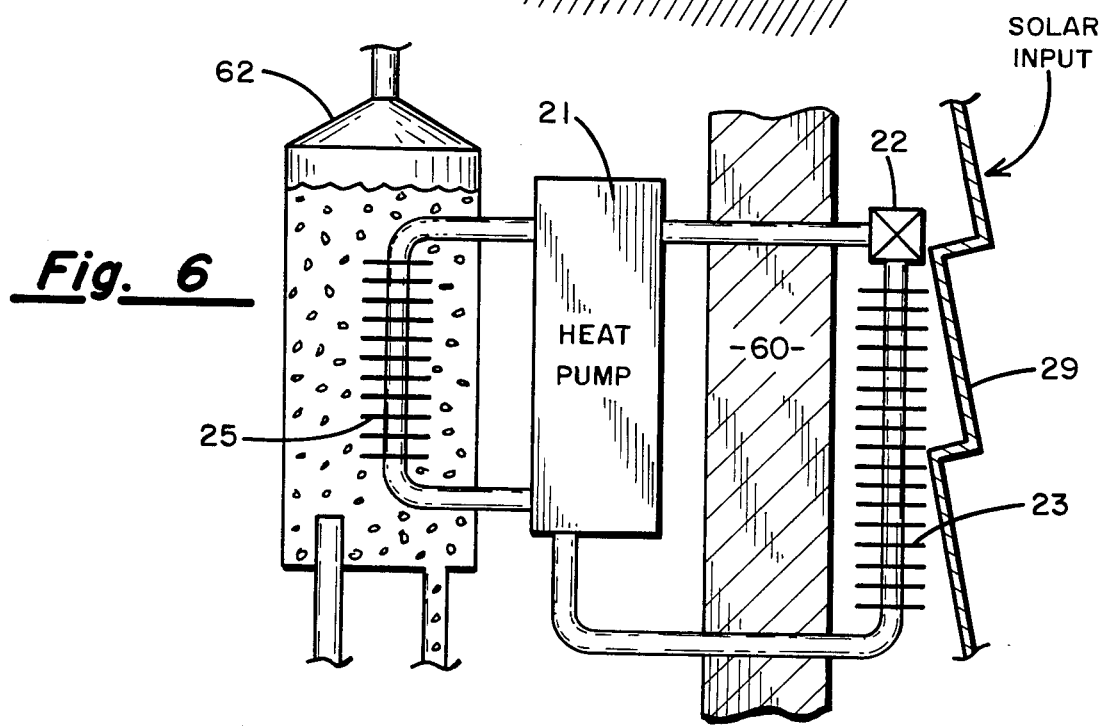
FIG. 6 shows a structure incorporating a heat pump, solar collection means and a secondary absorption cooling means.

FIG. 6 illustrates a special application of the system where there is a heavy air-conditioning load. Heat generated by the system is of course not discharged into the interior. Rather, it is discharged as the external energy source for any of many well-known absorption refrigeration means. A suitable commercially marketed means is a lithium-bromide-water absorption air conditioner. Specifically the discharge means 25 is located in the generator 62 of such an absorption refrigeration system. Thermodynamic work must usually be done by the heat pump mechanism 21 to make the concatenated system so described operate. Good passive insulation 60 is also required. The exact temperature of each portion of the component is a very complex function which is dependent on the site, the structure, the equipment, solar input, relative humidity, and indoor temperature. Optimum operation may thus require microprocessor control.

Lithium-bromide-water systems driven by solar input generally have a fractional COP, being limited by the temperature to which solar collectors can raise water under typical conditions of application. A COP of 0.7 is considered an upper limit in practice. Backup, which may be required for hot cloudy days and warm nights, may be provided by heat pump mechanism 21 operating without the secondary absorption cooling system.

The system depicted in FIG. 6 does not require sunlight for operation. It is fail safe in that it may be made to operate independent of the subsystem. It is at least doubly efficient in sunlight because it removes the solar energy falling on the structure as a factor in the air conditioning load. It then reuses the heat so gained for another round of air conditioning. Final heat discharge from the subsystem is suitable for hot water heating, swimming pool heating and process heat. Otherwise it is spent in the outside air.

Figure 7:
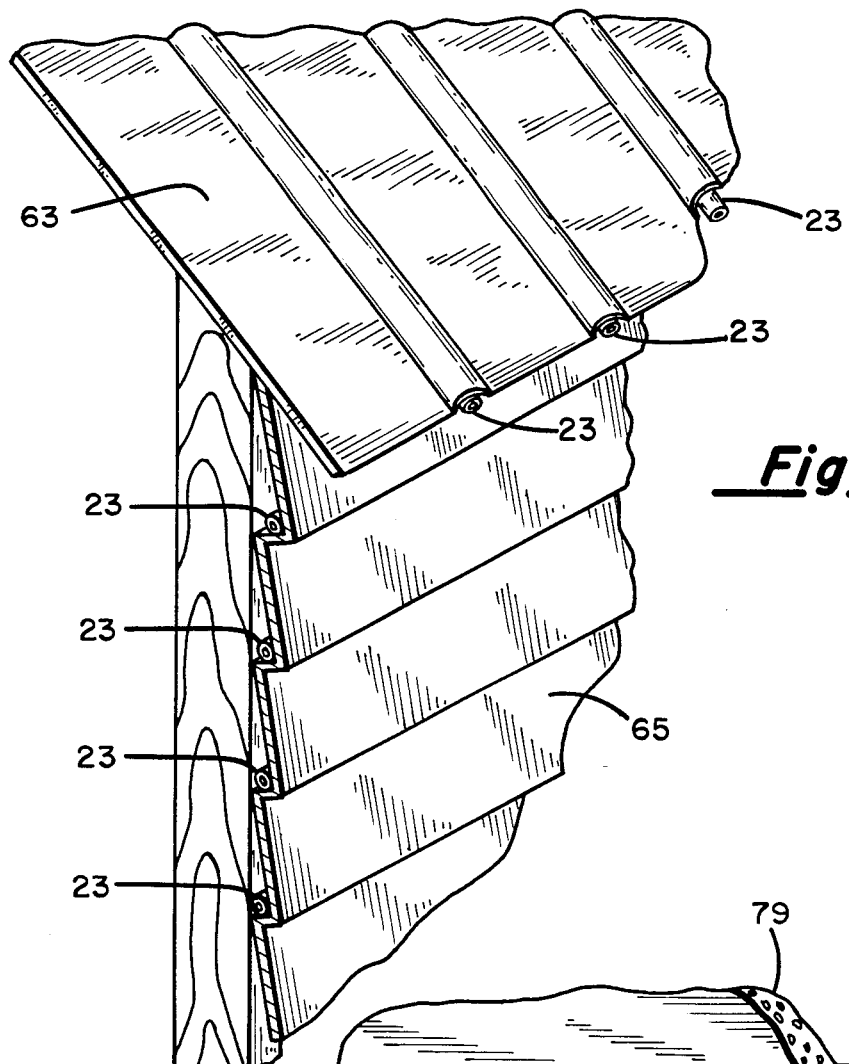
FIG. 7 shows an embodiment of the invention adapted to conventional roofing and siding.

FIG. 7 illustrates how heat absorption means 23 may be placed in thermal conductivity with roofing 63 or siding 65 to effect the processes illustrated in FIGS. 2-6. It is exemplary but not limiting that the roof or siding could be single integrated modular pieces with their heat absorption means respectively produced by forming, by extrusion or by intrusion. It is exemplary but not limiting that the roofing or siding could be modular and made so that it is sawable and nailable. It is exemplary but not limiting that each heat absorption means 23 could form a separate circuit with the system depicted in FIGS. 2-6 or that it could be interconnected advantageously in series by means of modular connector means. The roofing and siding could be made suitable for new construction or for retrofit of existing structures.

Figure 8:
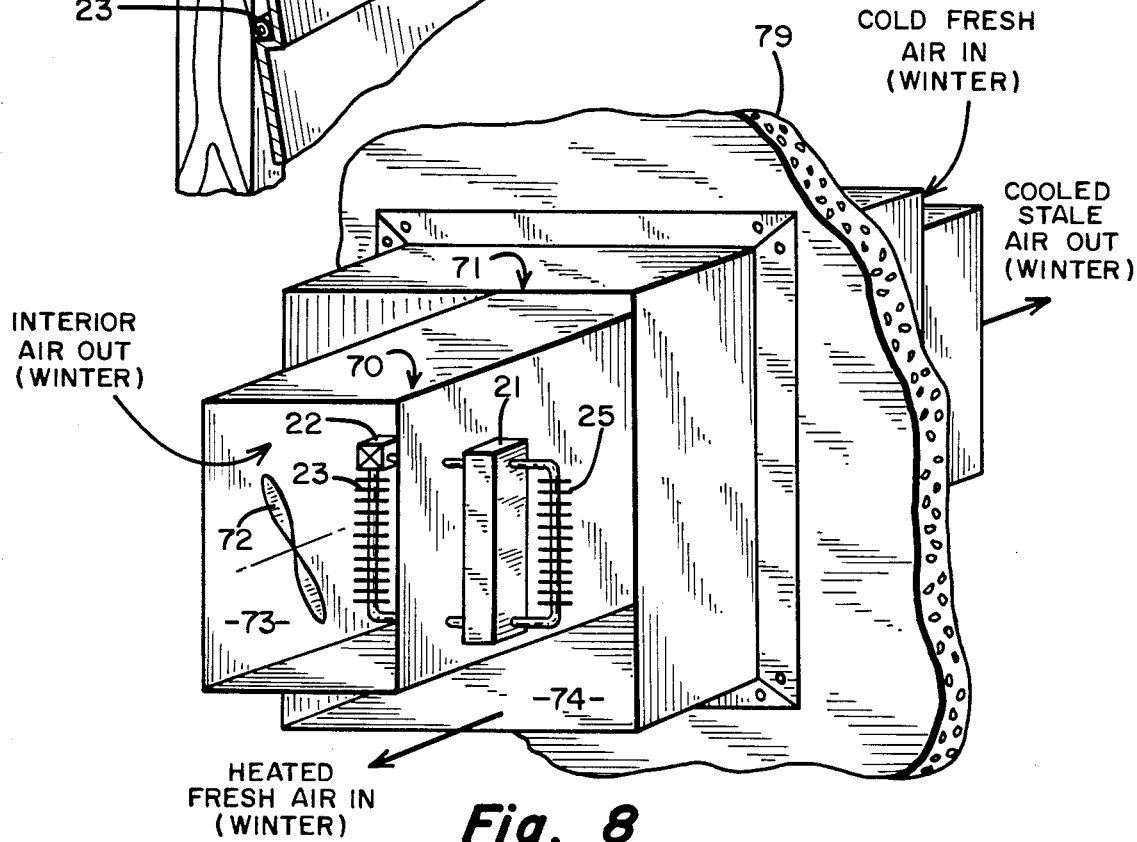
FIG. 8 shows a ventilating apparatus embodying the invention.

FIG. 8 illustrates a ventilation apparatus for exhausting stale air from an enclosed space and admitting fresh air to said space while attenuating, prohibiting or reversing heat transfer in the process.

A coaxial arrangement of two air passages 73 and 74 is encased in conduits 70 and 71 respectively. One air passage permits air to leave through the enclosure wall 79 while the other air passage admits air. An air motive device, depicted as fan blade 72 for the sake of example, moves the air through one or both of the air passages. Heat pump mechanism 21 drives down the temperature of the departing air by means of pressure reduction means 22 and heat uptake means 23. Meanwhile it transfers the heat of the departing air to the incoming air with heat discharge means 25.

If it is preferred that sufficient heat be drawn from the departing air to raise the temperature of the incoming air to a level equal to or greater than the temperature of the enclosed space then FIG. 8 illustrates a perfect insulator: no net heat energy can exit the enclosed space which the apparatus of FIG. 8 ventilates.

Heat uptake means 23 and heat discharge means 25 are extensible to the length of the ventilation apparatus and can be configured as cooperative, coaxial, counter-flow heat exchangers. With proper design the two can operate at virtually the same temperature throughout, thus reducing the thermodynamic work of the heat pump 25 to nil and minimizing its load, increasing its practical efficiency, and minimizing its cost.

In FIG. 8 heat pump 25 may be non-reversible. If it is non-reversible, the apparatus depicted diagramatically in FIG. 8 is nonetheless suitable for summer cooling provided that the air flows are reversed, as for example, by reversing air motive device 72.

The process of FIG. 8 is suitable to thermal control of other inputs and outputs from an enclosed volume, as will be obvious to any person conversant with the art.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A cooling system in combination with an enclosed structure having inside and outside walls, ceilings and floors and the like, comprising:
   (a) said outside walls having heat insulating properties and having means for preventing the flow of air therethrough;
   (b) said inside walls having heat insulating properties and having means for preventing the flow of air therethrough;
   (c) an intermediate region confined between said outside walls and said inside walls;
   (d) a heat pump mechanism placed inside said enclosed structure inside walls and a heat energy transfer medium associated therewith, said heat pump having means for passing said heat energy transfer medium therethrough and for transforming said medium thereby to release heat energy from said medium;
   (e) a heat energy radiator located in said intermediate region and coupled to said heat pump to permit the passage of said heat energy transfer medium therebetween, said heat energy radiator having a passage therethrough for said heat energy transfer medium and having means for radiating heat energy therefrom; and
   (f) a heat energy absorber inside said enclosed structure inside walls, and coupled to said heat pump to permit the passage of said heat energy transfer medium therebetween, said heat energy absorber having a passage therethrough for said heat energy transfer medium and having means for absorbing heat energy from inside said enclosed structure into said heat energy transfer medium.

2. A heating system in combination with an enclosed structure, said enclosed structure having exterior walls and the like to form an outer enclosure and having interior walls and the like to form an interior enclosure, said interior enclosure confining an interior space, comprising:
   (a) said exterior walls having heat insulating properties and having means for preventing the flow of air therethrough;
   (b) said interior walls having heat insulating properties and having means for preventing the flow of air therethrough;
   (c) an intermediate region confined between the exterior and interior walls;
   (d) a first heat pump mechanism placed inside said interior enclosure in said interior space, said heat pump mechanism including passages for containing a heat energy transfer medium and first means for transforming said heat energy transfer medium to release heat energy therefrom;
   (e) a heat discharge means in said interior space connected to said first heat pump mechanism passages, for discharging heat energy from said heat energy transfer medium into said interior space, and including an outlet for passing said heat energy transfer medium therefrom;
   (f) a first heat absorber located in said intermediate region said first heat absorber including means for absorbing heat energy into said heat energy transfer medium from the intermediate region between said outer enclosure and said interior enclosure, and including an outlet for passing said heat energy transfer medium therefrom; and
   (g) means for conveying said heat energy transfer medium from said heat absorber outlet to said first heat pump mechanism passages.

3. The apparatus of claim 2, further comprising a second heat pump mechanism, said second heat pump mechanism being powered by heat produced by said heat discharge means, said second heat pump further having heat absorption means for removing heat energy from said interior space, thereby to effect a cooling system for said interior space.

4. The apparatus of claim 3, wherein said first heat pump mechanism and said heat discharge means further comprise the compressor and the condenser, respectively, of an evaporator-compressor-condenser refrigeration-cycle heat pump and wherein said second heat pump mechanism further comprises a boiler-evaporator-absorber lithium-bromide-water air chiller.

5. The apparatus of claim 3, wherein said outside wall further comprises a siding surface attached to said enclosed structure and said inside wall further comprises a support wall on said structure.

6. The apparatus of claim 2, wherein:
   (a) said heat pump mechanism placed inside said interior enclosure in said interior space further comprises the compressor of an evaporator-compressor-condenser refrigeration-cycle heat pump;
   (b) said heat discharge means in said interior space further comprises the condenser of an evaporator-compressor-condenser refrigeration-cycle heat pump;

(c) said heat absorber located between said interior enclosure and said outer enclosure further comprises the evaporator of an evaporator-compressor-condenser refrigeration-cycle heat pump; and (d) said means for conveying said heat energy transfer medium further comprises the ductwork of an evaporator-compressor-condenser refrigeration-cycle heat pump.

7. The apparatus of claim 2, further comprising a second heat absorber located within said interior enclosure in said interior space, said second heat absorber connected into said means for conveying, and including passages therethrough for said heat energy transfer medium.

8. The apparatus of claim 2, wherein said exterior walls and said interior walls further comprise glass panes.

9. The apparatus of claim 2, wherein said heat energy transfer medium further comprises a refrigerant fluid.

10. The apparatus of claim 2, wherein said outside wall further comprises a siding surface attached to said enclosed structure and said inside wall further comprises a support wall on said structure.

* * * * *